United States Patent
Selma et al.

(10) Patent No.: US 11,956,729 B2
(45) Date of Patent: Apr. 9, 2024

(54) UPLINK POWER AND RESOURCE ALLOCATION ENHANCEMENT FOR USER DEVICES

(71) Applicant: GOOGLE LLC, Mountain View, CA (US)

(72) Inventors: Fernando Selma, Madrid (ES); Thomas Klingenbrunn, San Diego, CA (US); Aamir Akram, San Jose, CA (US); Hung Tsang, San Jose, CA (US)

(73) Assignee: GOOGLE LLC, Mountain View, CA (US)

( * ) Notice: Subject to any disclaimer, the term of this patent is extended or adjusted under 35 U.S.C. 154(b) by 127 days.

(21) Appl. No.: 17/157,424

(22) Filed: Jan. 25, 2021

(65) Prior Publication Data

US 2022/0232479 A1    Jul. 21, 2022

(30) Foreign Application Priority Data

Jan. 21, 2021  (EP) ..................................... 21382048

(51) Int. Cl.
*H04W 52/14*    (2009.01)
*H04W 8/24*     (2009.01)
(Continued)

(52) U.S. Cl.
CPC ........... *H04W 52/146* (2013.01); *H04W 8/24* (2013.01); *H04W 52/365* (2013.01); *H04W 72/0453* (2013.01); *H04W 72/0473* (2013.01)

(58) Field of Classification Search
None
See application file for complete search history.

(56) References Cited

U.S. PATENT DOCUMENTS

| 2011/0059706 A1* | 3/2011 | Harel | H01Q 3/00 455/115.1 |
| 2013/0053088 A1* | 2/2013 | Thorson | H04W 52/16 455/522 |

(Continued)

OTHER PUBLICATIONS

CMCC, "Discussion on SAR Issues for PC2 NR Inter-Band CA and SUL Configurations," 3GPP Draft (2021).

(Continued)

*Primary Examiner* — Ajit Patel
*Assistant Examiner* — Liem H. Nguyen
(74) *Attorney, Agent, or Firm* — MARSHALL, GERSTEIN & BORUN LLP

(57) ABSTRACT

A User Equipment 210 (UE) determines 215 a maximum UL/DL duty cycle to utilize for a connection with a base station 202 based on a content of a UE capabilities request 212 sent by the base station, where the maximum UL/DL duty cycle is typically is less than a most restrictive, possible UL/DL duty cycle of the UE, yet allows the UE to remain SAR compliant. The UE may determine 215 the maximum UL/DL duty cycle further based on, e.g., requested frequency bands, operational UE transceivers, carrier components, UE power class, stored power data, etc. The UE communicates 218 the maximum UL/DL duty cycle for the connection to the base station, thereby resulting in more efficient downlink data delivery during the connection as well as increasing cell site coverage and overall system efficiency. The UE may store a global parameter whose value is indicative of the maximum UL/DL duty cycle.

20 Claims, 4 Drawing Sheets

(51) Int. Cl.
*H04W 52/36* (2009.01)
*H04W 72/044* (2023.01)
*H04W 72/0453* (2023.01)

(56) References Cited

U.S. PATENT DOCUMENTS

| | | | | |
|---|---|---|---|---|
| 2013/0310106 | A1* | 11/2013 | Wang | H03K 17/955 |
| | | | | 327/517 |
| 2017/0094475 | A1* | 3/2017 | Nolan | H04W 4/70 |
| 2018/0255452 | A1* | 9/2018 | Wu | H04W 36/08 |
| 2018/0270838 | A1* | 9/2018 | Maheshwari | H04W 52/346 |
| 2019/0281504 | A1* | 9/2019 | Su | H04W 52/28 |
| 2019/0281598 | A1* | 9/2019 | Almalfouh | H04W 28/18 |
| 2020/0021421 | A1* | 1/2020 | Han | H04W 52/367 |
| 2020/0145927 | A1* | 5/2020 | Sun | H04W 76/27 |
| 2020/0314764 | A1* | 10/2020 | Noh | H04B 7/0695 |
| 2020/0314765 | A1* | 10/2020 | Jung | H04W 52/367 |
| 2020/0351858 | A1* | 11/2020 | Tsai | H04L 5/001 |
| 2020/0358589 | A1* | 11/2020 | Youtz | H04W 72/0446 |
| 2020/0383067 | A1 | 12/2020 | Liu et al. | |
| 2021/0058918 | A1* | 2/2021 | Zhou | H04W 52/367 |
| 2021/0160787 | A1* | 5/2021 | Zhou | H04W 52/146 |
| 2021/0167937 | A1* | 6/2021 | Youtz | H04L 5/0053 |
| 2021/0297959 | A1* | 9/2021 | Zhou | H04B 7/0602 |
| 2022/0053429 | A1* | 2/2022 | Hu | H04W 52/38 |
| 2022/0116891 | A1* | 4/2022 | Yao | H04W 52/325 |
| 2022/0124627 | A1* | 4/2022 | Oguma | H04W 52/146 |

OTHER PUBLICATIONS

Qualcomm Incorporated, "Inter-Band UL CA for FR2," 3GPP Draft (2020).

Search Report for European Application No. 21382048.3, dated Jun. 30, 2021.

"5G; NR; User Equipment (UE) Radio Access Capabilities (3GPP TS 38.306 version 16.1.0 Release 16)," ETSI TS 138 306 V16.1.0 (2020).

International Search Report and Written Opinion for Application No. PCT/US2022/013074, dated Apr. 12, 2022.

Moderator (China Telecom), "Email Discussion Summary for [97e][121] NR_SAR_PC2_interB_SUL_2BUL," 3GPP Draft (Nov. 16, 2020).

Nokia et al., "Handling of Maximum UL Duty Cycle," 3GPP Draft (Mar. 29, 2019).

"LTE; Evolved Universal Terrestrial Radio Access (E-UTRA); Radio Resource Control (RRC); Protocol Specification," 3GPP TS 36.331 V15.5.1 Release 15 (2019).

Mediatek, "5G NR Uplink Enhancements," (2018).

OPPO, "Email discussion summary for RAN4#94e_#20_NR_RF_FR2_req_enh_Part_1," 3GPP TSG-RAN WG4 Meeting #94-e (2020).

Sano et al., "5G Radio Performance and Radio Resource Management Specifications," Technology Journal, 20(3): 79-95 (2019).

* cited by examiner though SAR certification purposes, using the most restrictive possible UL/DL configuration of the UE (e.g., the "worst case scenario," which is typically based on a lowest power class supported by the UE and a lowest maximum LTE UL duty cycle) when establishing the maximum transmission power limits (MTPL) of the UE for SAR compliance results in extreme scenarios, e.g., 90-100% NR UL/DL duty cycle. The UE stores the maximum transmission power limits to which the UE is subject for SAR compliance, e.g., on a per frequency band basis.

UPLINK POWER AND RESOURCE ALLOCATION ENHANCEMENT FOR USER DEVICES

CROSS-REFERENCE TO RELATED APPLICATIONS

This patent application claims priority to and the benefit of European Patent Application No. 21382048.3 filed on Jan. 21, 2021 and entitled "Uplink Power and Resource Allocation Enhancement for User Devices," the entire disclosure of which is hereby incorporated by reference.

FIELD OF THE DISCLOSURE

This document relates to wireless communications and, more particularly, to systems, methods, and techniques of allocating uplink resources in wireless communications systems.

BACKGROUND

The background description provided within this document is for the purpose of generally presenting the context of the disclosure. Work of the presently named inventors, to the extent described in this background section, as well as aspects of the description that may not otherwise qualify as prior art at the time of filing, are neither expressly nor impliedly admitted as prior art against the present disclosure.

User equipment (UE) manufacturers (which are also referred to as Original Equipment Manufacturers or OEMs) must comply with jurisdictional regulatory authorities such as the Federal Communications Commission (FCC) in the United States or Council of the European Union to limit radio frequency (RF) energy exposed to the human body. Generally, regulatory authorities specify the maximum amount of energy that is absorbed per unit mass by a human body exposed to an electromagnetic field, and commonly refer to this parameter as Specific Absorption Rate (SAR). SAR depends on the maximum transmission power level (MTPL) of a UE, sub-carrier signal modulation, channel bandwidth, resource block allocation, the relative position of the device to the human body and, for time division duplex (TDD) transmissions, the Uplink (UL)/Downlink (DL) duty cycle (also referred to interchangeably herein as the "UL duty cycle"). Specifically, for TDD transmissions, larger numbers of radio resources configured for UL transmissions result in larger SAR values.

For UE SAR certification purposes, regulatory authorities typically mandate determining the SAR limits of a UE based on the supported configuration that generates the most transmitted power, e.g., a maximum transmitted power level (MTPL) of the UE. That is, the SAR limits are based on the lowest Power Class the UE supports and the highest UL/DL duty cycle provided by the 3GPP standard to which the UE conforms.

5G NR (New Radio)-compatible UEs may support 5G NR only in a standalone mode (SA), or may support 5G NR along with Long Term Evolution (LTE) in a dual-connectivity (DC) mode (e.g., by utilizing multiple uplinks). LTE provides for a fixed number UL/DL radio frame configurations. For example, 3GPP TS 36.211 V12.4.0 (2014 December), Table 4.2-2 defines seven UL/DL radio frame configurations. The specific LTE UL/DL configuration having the largest UL/DL duty cycle among the seven defined LTE UL/DL radio frame configurations typically results in a maximum LTE UL/DL duty cycle of about 65%.

Compared to LTE, however, 3GPP TS 38.213 V15.2.0 (2018 July) allows for greater flexibility of radio frame configurations for 5G NR, among which the largest UL/DL duty cycle is about 90-100% for TDD transmissions. As such, for SAR certification purposes, using the most restrictive possible UL/DL configuration of the UE (e.g., the "worst case scenario," which is typically based on a lowest power class supported by the UE and a lowest maximum LTE UL duty cycle) when establishing the maximum transmission power limits (MTPL) of the UE for SAR compliance results in extreme scenarios, e.g., 90-100% NR UL/DL duty cycle. The UE stores the maximum transmission power limits to which the UE is subject for SAR compliance, e.g., on a per frequency band basis.

Additionally, per the 3GPP Release 16 standard, during a Radio Resource Control (RRC) establishment procedure, the base station signals a specific UL/DL duty cycle with which the UE must comply. Today, in field deployments of commercial mobile broadband networks and systems, maximally-restrictive radio frame configurations are not widely utilized. This is because operators prioritize downlink capabilities over uplink capabilities, e.g., to support video streaming and other downlink data delivery intensive applications. For example, in present field deployments, the base station typically signals the UE to use a UL/DL duty cycle for the connection of around 25-30%, with which the UE must comply. Further, the base station does not update this UL/DL duty cycle in real-time.

As such, the operation of 5G NR-compatible UEs, which are theoretically capable of high UL/DL duty cycles not commonly utilized in practice (if at all), introduces unnecessarily large transmit power cut-backs, which in turn degrades the uplink RF performance of UEs and may underutilize available link resources. Indeed, basing the actual operations of 5G NR UEs on the most restrictive possible UL/DL configuration rather than on actually supported and/or utilized configurations may result in a reduction of SAR-compliant uplink transmit power and a reduction of cell site coverage. Accordingly, such a sub-optimally operated UE, while being SAR-compliant, needlessly decreases the efficiency of the overall system, as well as negatively impacts the user's experience.

SUMMARY

The techniques described in this document determine the maximum UL/DL duty cycle (e.g., the maximum TDD UL/DL duty cycle) a UE can use for a particular connection with a base station in view of the frequency bands supported by the UE and information received from the base station. Generally, the determined maximum UL/DL duty cycle of the UE used during the UE's connection with the base station is less than the maximum UL/DL duty cycle corresponding to the maximum transmit power level (MTPL) of the UE. That is, the determined maximum UL/DL duty cycle of the UE used during the UE's connection with the base station is typically less than the most restrictive possible UL/DL configuration of the UE which was used for certifying the UE for SAR compliance. These techniques also allow a UE to notify the base station of the maximum UL/DL duty cycle the UE has determined for the connection upon registering with the network, so that the base station may configure UL and DL resources accordingly and, in some situations, dynamically. In this manner, the system can provide better uplink performance and more comprehensive cell site coverage and system efficiencies while maintaining the UE's SAR compliance.

During a procedure for setting a radio connection for communicating with a base station, a UE receives, from the base station, a request for the capabilities of the UE, e.g., via a UECapabilityEnquiry message. Based on the content of the request for the capabilities of the UE, the UE determines a maximum uplink duty cycle for the connection with the base station. The UE then signals, to the base station, an indication of this maximum uplink duty cycle, e.g., via an Information Element (IE) of a UECapabilityInformation message. In many situations, the maximum UL duty cycle for the connection is less than a maximum UL duty cycle of the UE utilized to certify the UE for compliance with Specific Absorption Requirements (SAR) of a jurisdiction corresponding to the connection.

The UE may determine the maximum uplink duty cycle for the connection based on the content of the request for UE capabilities and a set of frequency bands supported by the UE, where the set of frequency bands supported by the UE may be different than a set of frequency bands supported by the base station and/or by the system in which the base station is included. In embodiments, the content of the request for UE capabilities indicates a set of frequency bands requested by the base station for possible use while communicating with the UE (e.g., a set of "requested" frequency bands). In these embodiments, the maximum UL duty cycle that the UE signals to the base station for the connection is a maximum UL duty cycle of a particular UE-supported frequency band having a lowest maximum UL duty cycle among one or more UE-supported frequency bands included in the set of requested frequency bands. In embodiments in which the content of the request for UE capabilities sent by the base station to the UE excludes an indication of any requested frequency band, the maximum UL duty cycle of the connection (which the UE signals to the base station) is a maximum UL duty cycle of a particular UE-supported frequency band having a lowest maximum UL duty cycle among an entirety of the set of UE-supported frequency bands. In these embodiments, the UE may store an indication of the maximum UL duty cycle in a global parameter, for example.

When radio connection configurations between the UE and the base station change, the UE may update the maximum UL duty cycle for the connection with the base station to correspond to the updated configuration. The UE may signal, to the base station, an indication of the updated maximum UL duty cycle for the updated connection so that the base station may re-configure UL and DL resources accordingly.

Advantageously, the techniques discussed within this disclosure may be utilized and, indeed, customized for any and all power classes supported by the UE.

In an example embodiment, a method in a user equipment device (UE) for managing resource allocation includes, during a procedure to establish a connection between the UE and a base station, receiving, by processing hardware of the UE from the base station, a request for capabilities of the UE; determining, by the processing hardware and based on a content of the request, a maximum uplink (UL) duty cycle of the UE for the connection; and providing, by the processing hardware to the base station, an indication of the maximum UL duty cycle.

DETAILED DESCRIPTION

Figure 1:
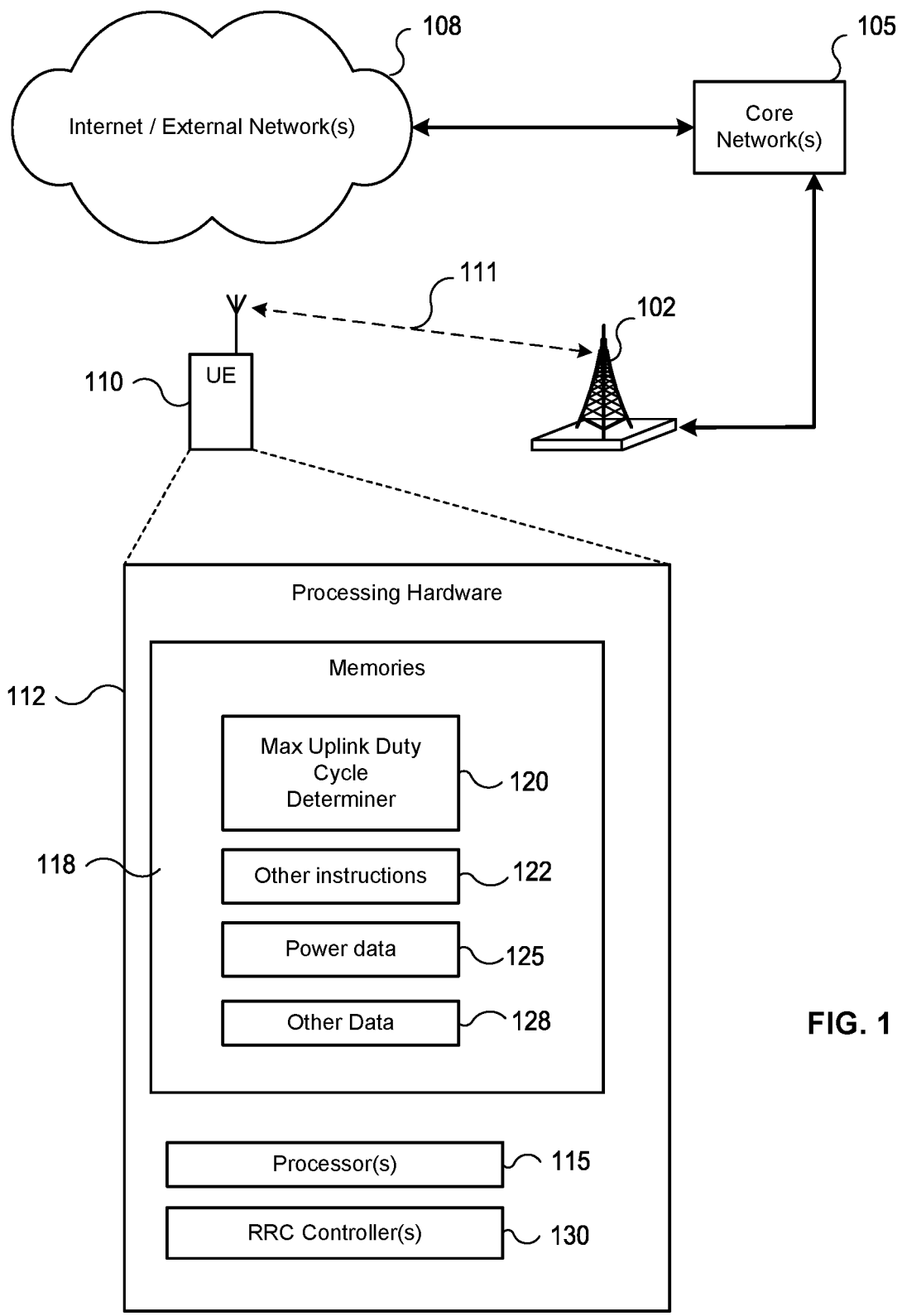
FIG. 1 depicts an example wireless communication system in which devices such as base stations and User Equipments (UEs) communicate data, where the system supports the management of resource allocation in accordance with at least some of the principles and techniques disclosed in this document.

FIG. 1 depicts an example wireless communication system 100 in which devices such as base stations and User Equipments (UEs) communicate data, and that supports the systems, methods, and techniques of this document. The wireless communication system 100 includes one or more base stations 102, which FIG. 1 depicts by a single base station representation and this document refers to by using the singular tense for ease of discussion (and not for limitation purposes). The base station 102 may support one or more Radio Access Networks (RANs) of one or more Radio Access Technologies (RATs), such as NR (New Radio), LTE (Long Term Evolution), and/or one or more RATs which may respectively utilize a sub-6 GHz frequency band, a mmWave frequency band, a Terahertz frequency band, a frequency band at or corresponding to 1900 MHz, a frequency band at or corresponding to 850 MHz, an unlicensed frequency band, etc. The base station 102 communicatively connects to one or more types of core networks (CNs) 105 (e.g., 5GC, EPC, etc.), which in turn communicatively connect to the Internet and/or any number of other networks 108, which may include one or more private and/or public networks 108. Similar to its depiction of the base station 102, FIG. 1 depicts the one or more core networks 105 by using a singular representation, and this document refers to the one or more CNs 105 by using the singular tense for ease of discussion (and not for limitation purposes).

A User Equipment (UE) 110, which can be any suitable device capable of wireless communications using one or more types of RATs, can communicatively connect (reference 111) with the wireless communication system 100 via the base station 102. The UE 110 includes processing hardware 112 that can include one or more processors (e.g., CPUs) 115 and one or more non-transitory, tangible, computer-readable memories 118 storing computer-executable instructions that the one or more processors 115 read and/or execute. Particularly, the instructions include maximum uplink (UL) duty cycle determination instructions 120 (which, for ease of reading, are also referred to within this document as the "max UL duty cycle determiner 120") for determining a maximum UL duty cycle for the UE 110 to utilize for the connection 111 and for informing the base station 102 of such, in accordance with one or more of the methods, principles, and techniques disclosed in this document. The memories 118 can also store other instructions 122, in embodiments. In an example implementation of the UE 110, the one or more processors 115 execute the computer-executable instructions 120, 122 to perform any one or more of the portions of the described methods and/or techniques. In some implementations, the one or more processors 115 execute the computer-executable instructions 120, 122 to operate in conjunction with firmware and/or other portions of the processing hardware 112 to perform any one or more of the portions of the described methods and/or techniques.

Additionally, the memories 118 of the UE 110 can store data that is utilized to perform any one or more of the portions of the methods and/or techniques described within this document. In particular, as illustrated in FIG. 1, the memories 118 store power data 125. Power data 125 may include data indicative of one or more maximum transmission power levels (MTPLs) of the UE 110. Typically, the MTPLs of the UE 110 are pre-determined, pre-configured into the power data 125, and indicate corresponding MPTL values so that the UE 110 complies with Specific Absorption Rate (SAR) requirements given the UE's various, fixed physical properties (such as the model of the UE 110, different numbers and types of antennas, etc.) as well as the possible variable properties of the UE 110 during operations (such as frequency band, sub-carrier signal modulation, channel bandwidth, resource block allocation, the relative position of the UE 110 to a human user, power classes supported by the UE, RATs supported by the UE, and, for time division duplex (TDD) transmissions, the Uplink (UL)/Downlink (DL) duty cycle ("UL duty cycle"). The UE 110 utilizes the MTPL information included in the power data 125 to determine a maximum transmit UL duty cycle (which this document interchangeably refers to as a "maximum UL duty cycle," a "max UL duty cycle," a "maximum TDD UL duty cycle," a "maximum TDD UL/DL duty cycle," or a "maximum UL/DL duty cycle") for a specific connection 111 with the base station 102 so that the UE 110 is able to comply with SAR requirements during operations while utilizing the connection 111. In general, the maximum uplink duty cycle represents the maximum percentage of a given time period during which a UE can transmit on an uplink without a predetermined Specific Absorption Rate being exceeded. The Specific Absorption Rate may be predetermined by a regulatory authority, for example.

In an embodiment, the power data 125 may include a respective MTPL for each frequency band supported by the UE 110, where at least some of the frequency band-specific MTPLs may differ. In some embodiments, the power data 125 may include respective MTPLs for at least some of the UE-supported frequency bands in different jurisdictions, where one or more of the jurisdiction-specific MTPLs may differ for a given frequency band. For example, the power data 125 may define a first MTPL for a specific UE-supported frequency band in a first jurisdiction, and may define a different, second MTPL for the specific UE-supported frequency band in a different, second jurisdiction. In some embodiments, the power data 125 additionally distinguishes MTPLs based on power class, so that different power classes supported by the UE 110 may be associated with different MTPLs (e.g., for a same frequency band and/or for a same jurisdiction).

Of course, the memories 118 may store other data 128 in addition to the power data 125. The UE 110 may utilize the stored data 125, 128 while performing one or more of the portions of the described methods and/or techniques. Further, as shown in FIG. 1, the example processing hardware 112 includes one or more Radio Resource Control (RRC) controllers 130 which are used to communicate Radio Frequency (RF) signals with the base station 102 via radios in accordance with one or more different types of RATs supported by the UE 110.

Generally speaking, when the UE 110 and the base station 102 undergo connection procedures to set up a communicative connection 111 via which data may be sent and received, the base station 102 requests the UE 110 to send an indication of the capabilities of the UE 110, e.g., via a UECapabilityEnquiry message. The UE 110 responds to the request, and returns information indicative of the UE's capabilities, including an indication of a maximum UL duty cycle of the UE 110 for the connection 111, e.g., so the UE 110 is able to maintain SAR compliance during the connection 111. For example, the UE 110 may signal its maximum UL duty cycle to the base station 102 via an Information Element (IE) of a UECapabilityInformation message.

As previously discussed, in response to a base station's query for UE capabilities, a currently-known UE merely signals, to the base station, its most restrictive maximum UL duty cycle. Typically, the most restrictive maximum UL duty cycle corresponds to the configuration utilized to certify the UE for SAR compliance, e.g., a configuration of a lowest power class supported by the UE and a maximum LTE UL duty cycle (e.g., a maximum supported or available LTE UL duty cycle, which may be 100% of the UE supports 100%). However, a currently-known UE does not determine its maximum UL duty cycle based on particular conditions of operations particular to the UE and/or to the base station to which the UE is connecting, and a currently-known UE does not have a mechanism for reporting locally-stored maximum UL/DL cycles to the base station to which the UE is connecting. As such, a currently-known UE may operate at a maximum UL/DL cycle determined based on a worst case scenario instead of allowing for operations up to a maximum UL/DL cycle customized for a particular connection of the UE with a particular base station while still maintaining SAR compliance. Further, operating a currently-known UE at its most restrictive maximum UL/DL duty cycle may introduce unnecessarily large power cut-backs and resulting degradations in uplink RF performances of the UE, as well as sub-optimal cell site coverage of the wireless communication system. Indeed, such sub-optimally operated, currently-known UEs, while being SAR-compliant, needlessly decrease the efficiency of the overall system, as well as negatively impact the user's experience.

Figure 2:
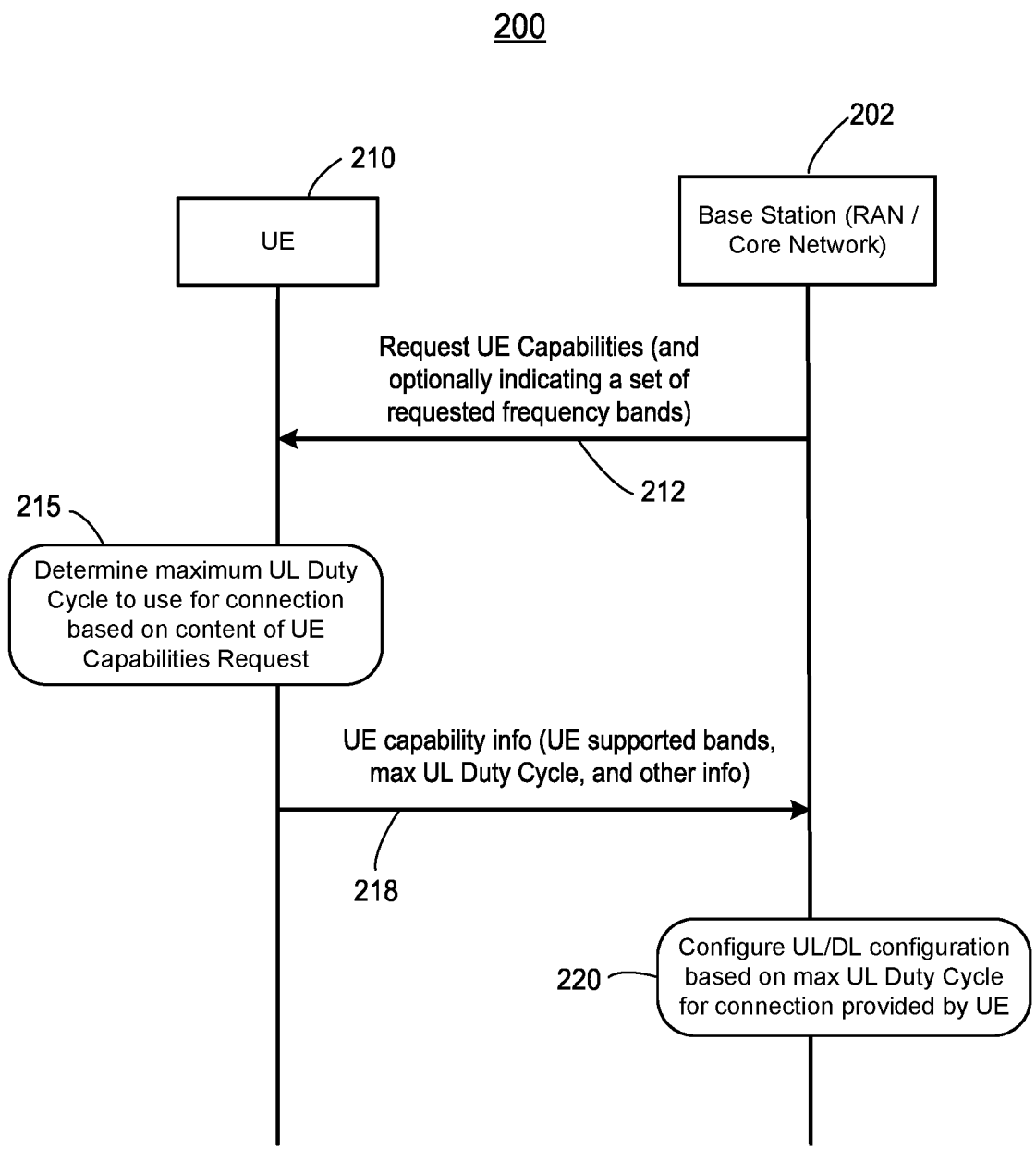
FIG. 2 depicts an example message flow between a base station and a UE to manage resource allocation in accordance with at least some of the principles and techniques disclosed in this document.

On the other hand, FIG. 2 depicts an example message flow 200 between a base station 202 and a UE 210 to manage resource allocations in a manner which is specific or customized for the connection between the UE 210 and the base station 202, in accordance with at least some of the principles and techniques disclosed in this document. Generally speaking, the base station 202 (e.g., one or more radios at the base station 202) is included in a RAN via which the UE 210 connects to a CN of the wireless communication system 100. For ease of discussion in this document, though, the RAN and CN associated with the base station 202 are not separately depicted in FIG. 2. Embodiments of the system 100 may implement embodiments of the example message flow 200, in some implementations. For example, the base station 202 may be the base station 102 of the system 100, and the UE 210 may be the UE 110 of the system 100. However, the message flow 200 may be implemented in other wireless communication systems other than the system 100, by other UEs other than the UE 110, and/or by other base stations other than the base station 102. For ease of illustration, though, and not for limitation purposes, this document discusses the message flow 200 with simultaneous reference to the system 100 depicted in FIG. 1.

During procedures for communicatively connecting the base station 202 and the UE 210, the base station 202 sends a request for the capabilities of the UE (reference 212). For example, the UE capabilities request 212 may be a UECapabilityEnquiry message, or some other suitable UE capabilities request message. In an embodiment, the UE capabilities request 212 indicates a set of requested frequency bands, which generally is a set of frequency bands which the base station 202 requests the UE 210 to utilize in communicating with the base station 202.

Upon receiving the UE capabilities request 212, the UE 210 determines 215 a maximum UL duty cycle for its connection with the base station 202 (e.g., connection 111 of FIG. 1) based on a content of the UE capabilities request 212. That is, instead of the UE 210 merely using the most restrictive UL duty cycle indicated by its stored power data 125, the UE 210 assesses the content of the UE capabilities request 212 and utilizes the contents of the request 212 to determine the maximum UL duty cycle which may be used for the connection 111 between the UE 210 and the base station 202. Said another way, the UE 210 customizes the maximum possible UL duty cycle for its connection 111 with the base station 202 based on the content of the base station's request 212. For example, the UE 210 may determine the maximum UL duty cycle for the connection 111 based on a set of requested frequency bands which the base station 202 indicates in the UE capabilities request 212, and/or based on other characteristics of and/or information included in the content of the UE capabilities request 212. Typically, the maximum UL duty cycle which the UE 210 determines 215 for the connection is less than the most restrictive maximum UL duty cycle of the UE 210, thus allowing for greater uplink data throughput via the connection 111 while maintaining the UE's SAR compliance. This document provides a more detailed description of the UE 210 determining 215 the maximum UL duty cycle for the connection 111 based on the UE Capabilities request 212 elsewhere in other sections.

In the message flow 200 of FIG. 2, upon determining 215 the maximum UL duty cycle for its connection 111 with the base station 202, the UE 210 indicates the determined maximum UL duty cycle to the base station 202 (along with other information) in a response 218 to the request 212. For example, the UE 110 may indicate its determined, maximum UL duty cycle for the connection 111 to the base station 102 via an Information Element (IE) of a UECapabilityInformation message, or via some other suitable field or response message. Upon reception of the response 218, the base station 202 configures 220 the UL/DL configuration for the connection 111 with the UE 210 based on the maximum UL duty cycle indicated by the UE 210 in the response 218.

Figure 3:
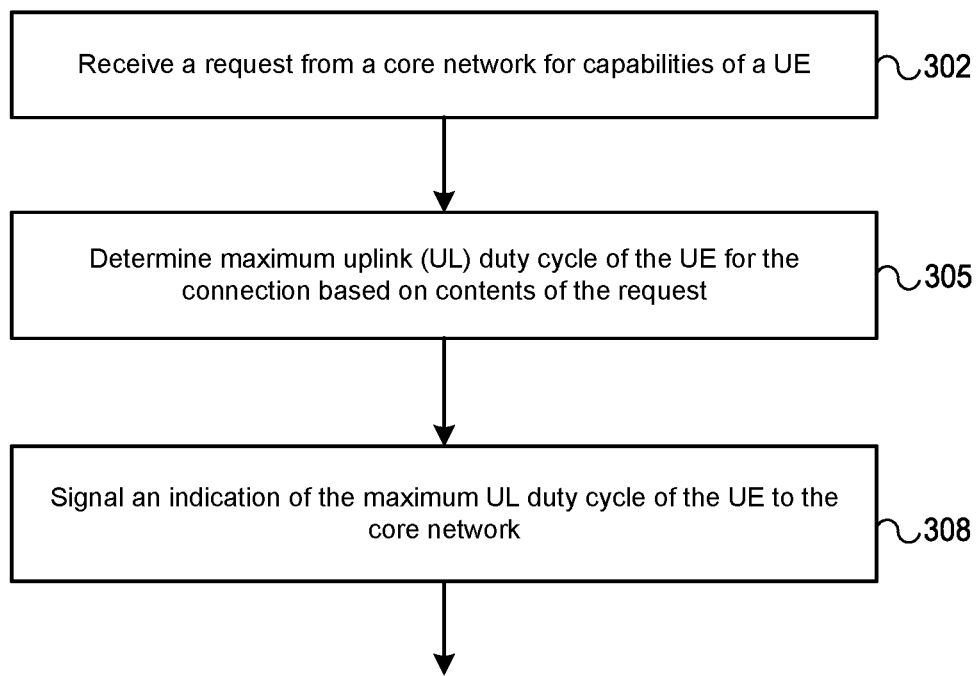
FIG. 3 depicts a flow diagram of an example method for managing resource allocation in accordance with at least some of the principles and techniques disclosed in this document.

FIG. 3 depicts a flow diagram of an example method 300 for managing resource allocation, e.g., for managing the allocation of resources utilized for communications between a UE and a base station, in accordance with at least some of the principles and techniques disclosed within this document. A UE may perform at least a portion of the method 300, for example. In an example implementation, the UE is the UE 110 of FIG. 1 or the UE 210 of FIG. 210, and the UE 110, 210 performs at least a portion of the method 300, e.g., by executing the maximum UL duty cycle determination instructions 120 and optionally other instructions 122. In some embodiments, at least a portion of the method 300 may be executed in conjunction with at least portions of one or more other methods and/or message flows described within this document. For example, at least a portion of the method 300 may be executed in conjunction with at least a portion of the message flow 200 of FIG. 2 and/or at least a portion of the message flow 400 of FIG. 4. In some embodiments, the method 300 includes one or more alternate and/or additional actions other than those shown in FIG. 3. For ease of discussion, and not for limitation purposes, though, this document discusses the method 300 with simultaneous reference to the wireless communication system 100 of FIG. 1 and the message flow 200 of FIG. 2, although the method 300 may execute in wireless communication systems other than the system 100 and/or in conjunction with messages flows other than the message flow 200.

As shown in FIG. 3, the method 300 includes, during a procedure to establish a connection between a UE and a base station, receiving 302, at the UE from the base station, a request for capabilities of the UE. As previously discussed, the UE may be the UE 110, the UE 210, or another suitable UE, for example. As such, in an example implementation, the processing hardware 112 of the UE 110 may receive the request for UE capabilities. The base station which sends the request for UE capabilities to the UE may be the base station 102, the base station 202, or another suitable base station of a wireless communication system, and/or the received request for UE capabilities may be the request 212 of FIG. 2, for example. The received request for UE capabilities 302 may be included in a UECapabilityEnquiry message or in some other suitable UE capabilities request message. In some scenarios, the received UE capabilities request includes an indication of a set of requested frequency bands, e.g., a set of frequency bands which the base station requests the UE to utilize for the connection.

Further, the method 300 may include, during the procedure to establish the connection between the UE and the base station, determining 305, by the processing hardware of the UE, a maximum uplink (UL) duty cycle of the UE for the connection based on a content of the received UE capabilities request. Determining 305 the maximum UL duty cycle for the connection based on the content of the received UE capabilities request may correspond to reference 215 of the message flow 200 of FIG. 2, for example. In an embodiment, determining 305 the maximum UL duty of the UE for the connection may be based on both the content of the request for UE capabilities and a set of frequency bands supported by the UE. The UE may store an indication of the set of frequency bands which it supports, e.g., in the power data 125 and/or in the other data 128 memories, for example, and may access and/or retrieve the stored indication to determine 305 the maximum UL duty cycle of the UE.

To illustrate, in a first example scenario pertaining to the block 305, the content of the received UE capabilities request indicates a set of frequency bands requested by the base station to use for the connection with the UE (e.g., a set of requested frequency bands). The UE may determine or identify a set of candidate frequency bands based on the set of frequency bands requested by the base station and the set of frequency bands supported by the UE. For example, the UE may determine one or more frequency bands, each of which is both (i) included in the set of requested frequency bands indicated by the base station and (ii) included in the set of UE-supported frequency bands indicated in the power data 125 and/or in the other data 128 memories. In an embodiment, determining the set of candidate frequency bands includes identifying all frequency bands which meet both (i) and (ii); that is, the determined set of candidate frequency bands is an intersection of the set of base station requested frequency bands and the set of UE-supported frequency bands.

Additionally in this first example scenario, for each candidate frequency band, the UE may retrieve an indication of a respective maximum UL duty cycle value, for example, by accessing the stored power data 125. As previously discussed, the power data 125 may store an indication of a respective MTPL for each frequency band supported by the UE. The indications of the respective MTPLs of the UE-supported frequency bands may be represented by respective maximum transmit power levels (e.g., in units of decibels per milliwatt (dBm), or in other suitable units), by respective maximum UL duty cycles (e.g., at least because a MTPL generated by the UE corresponds to the percentage of time and/or symbols a UE is transmitting on the UL compared to the percentage of time and/or symbols the UE is receiving on the downlink), or by any other suitable representation. At any rate, irrespective of the representation format of the respective MTPLs of the candidate frequency bands within the power data 125, the UE may compare the respective indications of the respective MTPLs of the candidate frequency bands to thereby determine a lowest UL duty cycle among the candidate frequency bands, and the UE may determine this lowest UL duty cycle among the candidate frequency bands to be the maximum UL duty cycle for the connection between the UE and the base station. As such, in this first example scenario, the UE determines the maximum UL duty cycle for the connection based only on the candidate frequency bands which may be used to support the connection, and not based on any frequency bands which will not be used for the connection. As such, the MTPL of a frequency band that will not be used for the connection does not have any influence on the maximum UL duty cycle of the connection. Further, as the UE determines the lowest UL duty cycle among the candidate frequency bands to be the maximum UL duty cycle for the connection of the UE with the base station, the maximum UL duty cycle of the connection corresponds to the most conservative or most limiting UL duty cycle among the candidate frequency bands, thereby ensuring the UE's SAR compliance irrespective of which candidate frequency band is utilized for the connection with the base station during operations. Advantageously, in this first example scenario, the maximum UL duty cycle for the connection is typically less than the most restrictive maximum UL duty cycle (e.g., the maximum UL duty cycle corresponding to the lowest MTPL indicated in the power data 125, which typically corresponds to the lowest power class supported by the UE and a maximum available or supported LTE UL duty cycle of the UE, which may be 100% if the UE supports 100%), and consequently allows a greater downlink data delivery throughput over that allowed by the most restrictive maximum UL duty cycle. Further, unlike the most restrictive maximum UL duty cycle which currently-known UEs utilize for all power classes supported by the UE, the maximum UL duty cycle for the connection may be determined or customized 305 specifically for any power class supported by the UE (e.g., as indicated in the power data 125).

With further regard to determining 305 the maximum uplink (UL) duty cycle of the UE for the connection based on the content of the received UE capabilities request, in a second example scenario pertaining to the block 305, the content of the received UE capabilities request excludes any indication of frequency bands requested by the base station to be utilized for the connection between the UE and the base station. Accordingly, in this second example scenario, the UE may determine the UE-supported frequency band which has a lowest UL duty cycle among an entirety of the set of UE-supported frequency bands. For example, the UE may retrieve a respective indication of a respective MTPL for each UE-supported frequency band, e.g., by accessing the stored power data 125 in a manner similar to that discussed above for the first example scenario. In this second example scenario, the UE may compare the respective indications of the respective MTPLs of the entire set of UE-supported frequency bands to thereby identify a lowest UL duty cycle among the entire set of UE-supported frequency bands, and the UE may determine this lowest UL duty cycle to be the maximum UL duty cycle for the connection between the UE and the base station. As the UE determines the lowest UL duty cycle among the entirety of the set of UE-supported frequency bands to be the maximum UL duty cycle for the connection, the maximum UL duty cycle of the connection corresponds to the most conservative or most limiting UL duty cycle among the set of UE-supported frequency bands, thereby ensuring the UE's SAR compliance irrespective of which UE-supported frequency band is utilized for the connection with the base station during operations.

In an embodiment, the UE performs the comparison of respective MTPLs of the set of UE-supported frequency bands a priori and not in-line with a specific connection procedure with a base station. For example, as the UE stores indications of all frequency bands which the UE supports, e.g., in the power data 125 and/or in the other data 128, the UE may determine, a priori, the maximum UL duty cycle for any connection where a base station does not request any frequency band during connection setup procedures with the UE. The UE may store an indication of this maximum UL duty cycle corresponding to the entire set of UE-supported frequency bands in a global parameter, e.g., as part of the power data 125 or in the other data 128. As such, during operations, when a base station does not indicate any requested frequency bands during a connection set up procedure (e.g., within a request for UE capabilities), the UE may simply access the global parameter to determine the maximum UL duty cycle for the corresponding connection. In some implementations, rather than the UE performing the comparison of MTPLs for the set of UE-supported frequency bands and populating the global parameter, an off-line process may determine the value of the global parameter and populate the global parameter along with configuring the UE with the power data 125 or the data 128, e.g., prior to the UE being activated for operations. As such, the UE may be pre-configured with both the power data 125 and an indication of the maximum UL duty cycle to utilize when a base station does not indicate any requested frequency bands. As utilized herein, the parameter is a "global" parameter as the value of the parameter may apply to any and all of the frequency bands supported by the UE. That is, the maximum UL duty cycle indicated by the value stored in the global parameter is applicable to each frequency band supported by the UE.

Additionally with regard to the block 305 of the method 300, in an embodiment, determining 305 the maximum UL duty cycle of the UE for the connection may be further based on a number of operational UL transceivers of the UE. The UE may include one or more transceivers corresponding to one or more RATs and frequency bands, e.g., 4G LTE, 5G NR, Wi-Fi, satellite, mmWave, sub-6 GHz, etc., at least one of which may be operational at any given time. When only one of the transceivers of the UE is operational or active, determining the maximum UL duty cycle for the connection may proceed in a manner such as described above, e.g., for UE capabilities request messages with and without indications of requested frequency bands. That is, when the UE has only a single operational or active transceiver, the maximum UL duty cycle for the connection between the UE and the base station may correspond to the maximum UL power budget for the UE as a whole.

On the other hand, when more than one transceiver of the UE is operational or active, the maximum UL duty cycle of the UE for the connection, e.g., the maximum UL power budget for the UE as a whole, may be allocated among the multiple operational/active transceivers. Multiple transceivers may be simultaneously operational or active at the UE, for example, when the UE utilizes radio technologies such as UL Carrier Aggregation or Dual Connectivity. In these situations, the UE may first determine an overall maximum UL duty cycle for the connection with the base station. In other words, the UE may first determine a UL power budget for the UE as a whole, e.g., in a manner such as described above for UE capabilities messages with and/or without indications of requested frequency bands. Subsequently, UE may allocate equal or non-equal portions of the UE's overall UL power budget among the multiple operational transceivers to thereby determine the respective maximum UL duty cycle of each transceiver for the connection. In an embodiment, the UE may decrease the respective maximum UL duty cycles of the transceivers based on a total number of operational/active transceivers at the UE, for example, in a proportional manner so that each operational/active transceiver is allocated an equal portion of the UE's overall UL power budget. In another embodiment, the UE may decrease the respective maximum UL duty cycles of the multiple, operational/active transceivers based on respective bandwidths supported by the transceivers which are active/operational. For example, an active transceiver which supports a wider bandwidth may be allocated a smaller portion of the UE's overall UL power budget relative to the portion of the UE's overall UL power budget allocated to an active transceiver which supports a narrower bandwidth, e.g., so that the relative sizes of the non-equal allocated proportions of the UE's overall UL power budget proportionally correspond to the relative sizes of the transceivers' respective bandwidths. In yet another embodiment, the UE may decrease the respective maximum UL duty cycles of the multiple, operational/active transceivers in a manner that is not proportional. For example, the UE may decrease a first active transceiver's duty cycle from 80% to 70% and decrease a second active transceiver's duty cycle from 80% to 20% even though both transceivers support a same bandwidth. Of course, the UE may additionally or alternatively utilize other types of scaling or other modifications to allocate or determine the respective maximum UL duty cycles of multiple active/operational transceivers with respect to the connection with the base station and optionally one or more additional base stations. Additionally, if the number of operational/active transceivers changes, the UE may adjust the respective portions of the UE's overall UL power budget for each of the remaining operational/active transceivers.

Still, during the procedure to establish the connection between the UE and the base station, the method 300 may include providing or signaling 308, by the processing hardware to the base station, an indication of the determined maximum UL duty cycle. For example, the UE may provide or signal 308 the indication of the maximum UL duty cycle to the base station in a response to the request of the base station, such as in an IE of a message that reports the capabilities of the UE to the base station, e.g., the response message 218 of FIG. 2. The response message may be, for example, a UECapabilityInformation message, or some other suitable response message.

In some embodiments, the method 300 further includes updating the maximum UL duty cycle of the UE for the connection with the base station when the carrier configuration changes, for example, due to an addition or a removal of one or more carrier components, e.g., as related to Carrier Aggregation or Dual Connectivity (not shown in FIG. 3). For example, the UE may reallocate equal or non-equal portions of the overall UL power budget of the UE among the carrier components of the changed configuration. In an embodiment, the UE may proportionally increase or decrease the respective maximum UL duty cycles of the carrier components based on a total number of carrier components of the changed carrier configuration, so that each carrier component is re-allocated an equal portion of the UE's overall UL power budget. In another embodiment, the UE may proportionally increase or decrease the respective maximum UL duty cycles of the carrier components based on the respective bandwidths of the carrier components of the changed carrier configuration. For example, a carrier component which supports a wider bandwidth may be allocated a smaller portion of the UE's overall UL power budget relative to the size of the portion of the UE's overall UL power budget allocated to a carrier component which supports a narrower bandwidth, e.g., so that the relative sizes of the non-equal, re-allocated portions of the UE's overall UL power budget proportionally correspond to the relative sizes of the carrier components' respective bandwidths. Of course, the UE may additionally or alternatively utilize other types of scaling or other modifications to re-allocate or determine the respective maximum UL duty cycles of the carrier components of the changed carrier configuration. At any rate, the UE may provide an indication of the updated, respective maximum UL duty cycle (e.g., of a corresponding carrier component) corresponding to the connection to the base station. For instance, the UE may transmit, to the base station, an indication that its capabilities have been updated (e.g., via a Tracking Area Update (TAU) message). In response, the base station transmits a request for the updated UE capabilities, and the response of the UE to the UE capabilities request includes an indication of the updated maximum UL duty cycle.

Figure 4:
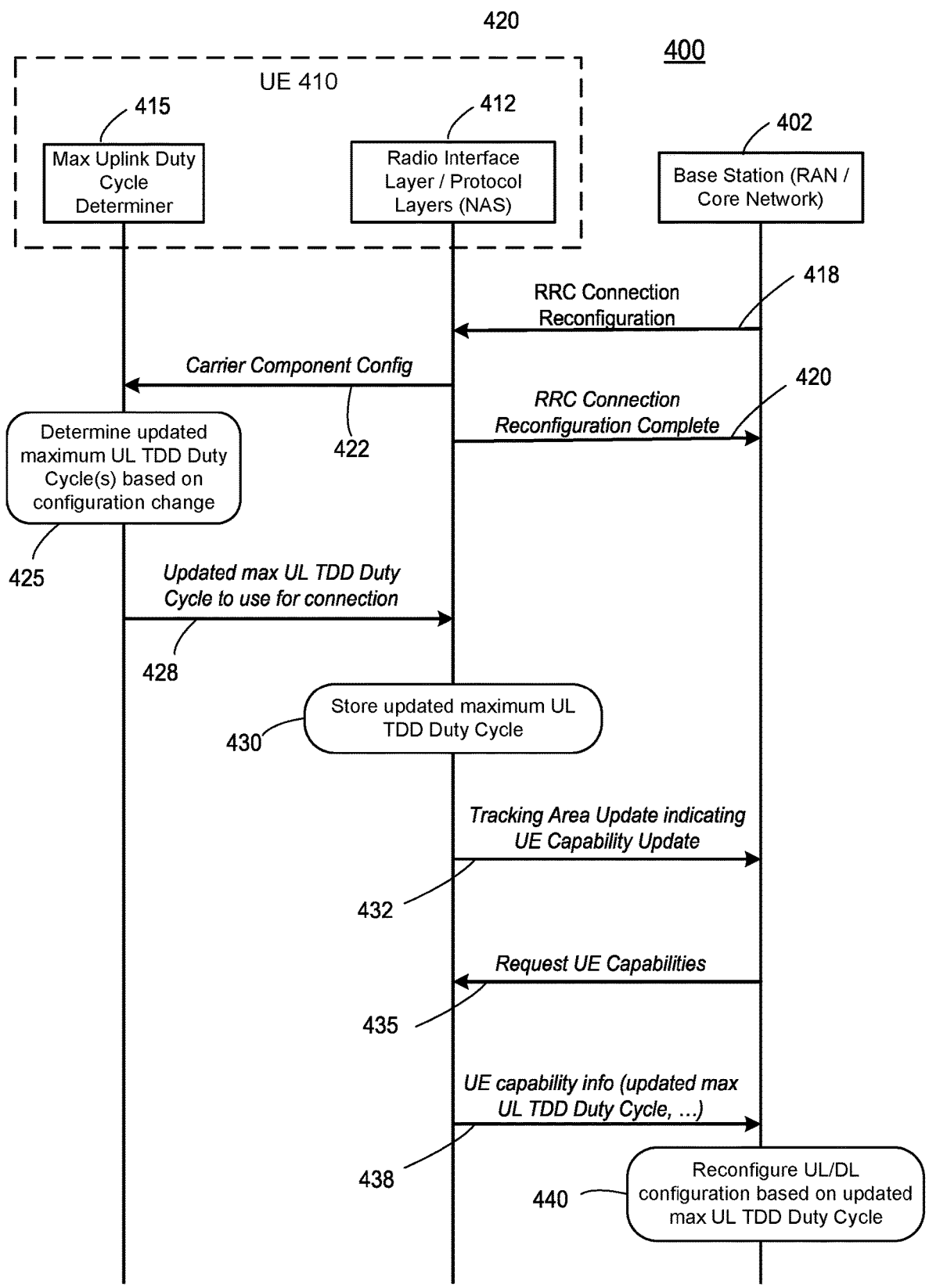
FIG. 4 depicts an example message flow between a base station and a UE to manage resource allocation in accordance with at least some of the principles and techniques disclosed in this document.

To illustrate, FIG. 4 depicts an example message flow 400 between a base station 402 and a UE 410 to manage resource allocation, in accordance with at least some of the principles and techniques disclosed in this document. The message flow 400 may be implemented in conjunction with embodiments of the system 100 of FIG. 1, embodiments of the message flow 200 of FIG. 2, and/or embodiments of the method 300 of FIG. 3, if desired. For example, the base station 402 may be the base station 102 of FIG. 1 or the base station 202 of FIG. 2, and/or the UE 410 may be the UE 110 of FIG. 1 or the UE 210 of FIG. 2. However, the message flow 400 may be implemented in other wireless communication systems other than the system 100, by other UEs other than the UEs 110, 210, and/or by other base stations other than the base stations 102, 202. For ease of illustration, though, and not for limitation purposes, this document discusses the message flow 400 with simultaneous reference to the system 100 depicted in FIG. 1 and the method 300 of FIG. 3.

In FIG. 4, the base station 402 (e.g., one or more radios at the base station 402) is included in a RAN via which the UE 410 connects to a CN of the wireless communication system 100. For ease of discussion in this document, though, the RAN and CN associated with the base station 410 are not separately depicted in FIG. 4. FIG. 4 depicts two components of the UE 410: the interface 412 of the UE 410 to, for example, the Radio Interface Layer (RIL) and the protocol layers of the Non-Access Stratum (NAS), and the maximum UL duty determiner 415, which may be, for example, the maximum UL duty determiner 120 of FIG. 1.

In the scenario 400 depicted in FIG. 4, the radio connection between the base station 402 and the UE 410 has already been established, e.g., via message flow similar to message flow 200 of FIG. 2, and/or via a method similar to the method 300, for example. Further, in FIG. 4, a change in the configuration of the carrier component(s) utilized between the base station 402 and UE 410 occurs. For example, UL Carrier Aggregation (CA) may be added to the configuration, or UL CA may be removed. Accordingly, the base station 402 notifies the UE of the change to the configuration of the carrier component(s) corresponding to the connection (reference 418), e.g., via an RRC Connection Reconfiguration message or other suitable message. In an embodiment, the reconfiguration message 418 includes an indication of the changed carrier component configuration. The interface 412 of the UE 410 receives the reconfiguration message 418, and returns an acknowledgement of a receipt of the changed configuration to the base station 402 (reference 420), e.g., via an RCC Connection Reconfiguration Complete message, or other suitable message. Additionally, the interface 412 notifies the maximum UL duty determiner 415 of the change(s) to the carrier components corresponding to the connection between the UE 410 and the base station 402 (reference 422). Based on the changed carrier components 422, the maximum UL duty determiner 415, 120 determines a respective updated maximum UL duty cycle for each carrier component of the changed configuration (reference 425), e.g., in a manner such as described above with respect to the method 300. For example, the respective updated maximum UL duty cycle(s) may be updated based on a total number of carrier components included in the changed configuration, based on respective bandwidths of the carrier components included in the changed configuration, or in some other manner. The maximum UL duty determiner 415 informs the interface 412 of the UE 410 of the updated maximum UL duty cycle(s) (reference 428), and the interface 412 stores the updated maximum UL duty cycle(s) (reference 430).

Additionally, the interface 412 of the UE 410 notifies the base station 402 of the updated maximum UL duty cycle(s) (reference 432). For example, the UE 410 may transmit a Tracking Area Update (TAU) to the base station 410, where the TAU indicates that the capabilities of the UE have been updated, and in response, the base station 410 may transmit a request for UE capabilities (reference 435) to thereby obtain indications of the updated UE capabilities (reference 438), including an indication of the update maximum UL duty cycle(s). Based on the updated maximum UL duty cycle(s), the base station 402 may re-configure 440 the UL/DL for the connection between the base station 402 and the UE 410.

The following additional considerations apply to the foregoing discussion.

A user device or User Equipment (UE) in which the techniques of this document can be implemented (e.g., the UE 110, 210, 410) can be any suitable device capable of wireless communications such as a smartphone, a tablet computer, a laptop computer, a mobile gaming console, a point-of-sale (POS) terminal, a health monitoring device, a drone, a camera, a media-streaming dongle or another personal media device, a wearable device such as a smartwatch, a wireless hotspot, a femtocell, or a broadband router. Further, the user device in some cases may be embedded in an electronic system such as the head unit of a vehicle or an advanced driver assistance system (ADAS). Still further, the user device can operate as an internet-of-things (IoT) device or a mobile-internet device (MID). Depending on the type, the user device can include one or more general-purpose processors, a computer-readable memory, a user interface, one or more network interfaces, one or more sensors, etc.

Certain embodiments are described in this document as including logic or a number of components or modules. Modules may can be software modules (e.g., code stored on non-transitory machine-readable medium) or hardware modules. A hardware module is a tangible unit capable of performing certain operations and may be configured or arranged in a certain manner. A hardware module can include dedicated circuitry or logic that is permanently configured (e.g., as a special-purpose processor, such as a field programmable gate array (FPGA) or an application-specific integrated circuit (ASIC)) to perform certain operations. A hardware module may also include programmable logic or circuitry (e.g., as encompassed within a general-purpose processor or other programmable processor) that is temporarily configured by software to perform certain operations. The decision to implement a hardware module in dedicated and permanently configured circuitry, or in temporarily configured circuitry (e.g., configured by software) may be driven by cost and time considerations.

When implemented in software, the techniques can be provided as part of the operating system, a library used by multiple applications, a particular software application, etc. The software can be executed by one or more general-purpose processors or one or more special-purpose processors.

Upon reading this document, those of skill in the art will appreciate still additional alternative structural and functional designs for enhancing the handling of user equipment in a radio resource control inactive state through the principles disclosed in this document. Thus, while this document illustrates and describes particular embodiments and applications, the disclosed embodiments are not limited to the precise construction and components disclosed. Various modifications, changes and variations, which will be apparent to those of ordinary skill in the art, may be made in the disclosed arrangement, operation and details of the method, and apparatus without departing from the spirit and scope defined in the appended claims.

Further, although the foregoing text sets forth a detailed description of numerous different embodiments, it should be understood that the scope of the patent is defined by the words of the claims set forth at the end of this patent. The detailed description is to be construed as exemplary only and does not describe every possible embodiment because describing every possible embodiment would be impractical, if not impossible. Numerous alternative embodiments could be implemented, using either current technology or technology developed after the filing date of this patent, which would still fall within the scope of the claims and all equivalents thereof. By way of example, and not limitation, the disclosure herein contemplates at least the following aspects or examples:

Example 1. A method in a user equipment device (UE) for managing resource allocation, the method comprising, during a procedure to establish a connection between the UE and a base station: receiving, by processing hardware of the UE from the base station, a request for capabilities of the UE; determining, by the processing hardware and based on a content of the request, a maximum uplink (UL) duty cycle of the UE for the connection; and providing, by the processing hardware to the base station, an indication of the maximum UL duty cycle for the connection.

Example 2. The method of Example 1, wherein providing the indication of the maximum UL duty cycle includes: including the indication in an Information Element (IE) of a message that reports capabilities of the UE.

Example 3. The method of any one of Example 1 or Example 2, wherein determining the maximum UL duty cycle for the connection includes: determining the maximum UL duty cycle further based on a set of frequency bands supported by the UE, each frequency band of the set of frequency bands associated with a respective maximum UL duty cycle.

Example 4. The method of Example 3, further comprising: retrieving, by the processing hardware from a memory of the UE, an indication of at least one maximum UL duty cycle associated with the set of frequency bands.

Example 5. The method of any one of Examples 3 or 4, wherein: the content of the request indicates a set of requested frequency bands; and determining the maximum UL duty cycle based on the set of UE-supported frequency bands includes:
identifying, by the processing hardware, a set of candidate frequency bands that are both supported by the UE and included in the set of requested frequency bands; retrieving a set of indications of maximum UL duty cycles corresponding to the set of candidate frequency bands; and selecting, based on the set of indications of maximum UL duty cycles, a lowest maximum UL duty cycle as the maximum UL duty cycle for the connection.

Example 6. The method of Example 5, wherein identifying the one or more candidate frequency bands includes identifying each UE-supported frequency band included in the set of requested frequency bands.

Example 7. The method of any one of Examples 3-4, wherein determining the maximum UL duty cycle for the connection includes: determining that the content of the request does not specify any requested frequency bands; determining a frequency band having a lowest maximum UL duty cycle among the set of frequency bands supported by the UE; and selecting the duty cycle of the determined frequency band as the maximum UL duty cycle of the UE for the connection.

Example 8. The method of Example 7, wherein determining the frequency band having the lowest maximum UL duty cycle among the set of frequency bands supported by the UE includes accessing, by the processing hardware, a global parameter stored in a memory of the UE.

Example 9. The method of any one of Examples 1-8, wherein the maximum UL duty cycle of the UE for the connection is less than a UL duty cycle of the UE corresponding to a maximum transmission power level (MTPL) of the UE.

Example 10. The method of Example 9, wherein the UL duty cycle of the UE corresponding to the MTPL of the UE corresponds to a lowest power class supported by the UE and a configuration of the UE that has a maximum available UL duty cycle.

Example 11. The method of any one of Examples 1-10, further comprising storing, in a memory of the UE, power data indicative of a respective maximum transmission power level (MTPL) for each frequency band supported by the UE; and wherein determining the maximum UL duty cycle of the UE for the connection is further based on the power data.

Example 12. The method of Example 11, wherein storing the power data indicative of the MTPLs for the UE-supported frequency bands includes storing an indication of a respective MTPL for each jurisdiction in a plurality of jurisdictions for which the UE is configured.

Example 13. The method of any one of Examples 11-12, wherein storing the power data indicative of the MTPLs for the UE-supported frequency bands includes storing an indication of a respective MTPL for each power class supported by the UE.

Example 14. The method of any one of Examples 11-13, wherein determining the maximum UL duty cycle for the connection is further based on a number of operational UL transceivers of the UE.

Example 15. The method of any one of Examples 11-14, wherein: the UE includes only a single operational UL transceiver, and determining the maximum UL duty cycle for the connection based on the power data comprises selecting a lowest maximum UL duty cycle among respective maximum UL duty cycles of a candidate set of UE-supported frequency bands to which the power data corresponds.

Example 16. The method of any one of Examples 11-14, wherein: the UE includes multiple operational UL transceivers; and determining the maximum UL duty cycle of the UE for the connection based on the power data includes:
selecting a lowest maximum UL duty cycle among respective maximum UL duty cycles of a candidate set of UE-supported frequency bands to which the power data corresponds; and decreasing the selected lowest maximum UL duty cycle based on a total number of the multiple operational UL transceivers to determine the maximum UL duty cycle of the UE for the connection.

Example 17. The method of Example 16, wherein decreasing the selected lowest maximum UL duty cycle based on the total number of the multiple operational UL transceivers comprises proportionally decreasing the selected lowest maximum UL duty cycle based on the total number of the multiple operational UL transceivers.

Example 18. The method of any one of Examples 11-17, wherein: the UE includes multiple operational UL transceivers; and determining the maximum UL duty cycle of the UE for the connection based on the power data includes:
selecting a lowest maximum UL duty cycle among respective maximum UL duty cycles of a candidate set of UE-supported frequency bands to which the power data corresponds; and decreasing the selected lowest maximum UL duty cycle based on respective bandwidths associated with the multiple operational UL transceivers to determine the maximum UL duty cycle of the UE for the connection.

Example 19. The method of any one of Examples 1-18, further comprising: determining, by the processing hardware of the UE, an updated maximum UL duty cycle of the UE for the connection based on a change to a carrier configuration; and providing, by the processing hardware of the UE to the base station, an indication of the updated maximum UL duty cycle.

Example 20. The method of Example 19, wherein: the change to the carrier configuration includes one of an addition or a removal of one or more carrier components; and determining the updated maximum UL duty cycle for the connection includes determining the updated maximum UL duty cycle for the connection based on a total number of carrier components of the changed carrier configuration.

Example 21. The method of any one of Examples 19-20, wherein: the change to the carrier configuration includes one of an addition or a removal of one or more carrier components; and determining the updated maximum UL duty cycle for the connection includes determining the updated maximum UL duty cycle for the connection based on respective bandwidths of the carrier components of the changed carrier configuration.

Example 22. The method of any one of Examples 19-21, wherein the request for the capabilities of the UE is a first request for UE capabilities, and providing the indication of the updated maximum UL duty cycle to the base station includes:
transmitting, by the processing hardware of the UE to the base station, an indication that the capabilities of the UE have been updated; receiving, by the processing hardware from the base station, a second request for UE capabilities in response to the indication that the capabilities of the UE have been updated; and providing, by the processing hardware to the base station, the indication of the updated maximum UL duty cycle in response to the second request for UE capabilities.

Example 23. A User Equipment (UE) configured to perform the method of any one of Examples 1-22.

Example 24. The UE of Example 23, configured to operate at any power class of a set of multiple power classes supported by the UE.

Example 25. Any one of the preceding Examples in combination with any other one of the preceding Examples.

Example 26. A computer-readable medium comprising instructions which, when executed by a processor, cause a user equipment comprising the processor to perform the method of any one of Examples 1-22.

What is claimed is:

1. A method performed by a user equipment device (UE) for managing resource allocation, the method comprising, during a procedure to establish a connection between the UE and a base station:
   receiving, by the UE from the base station, a request for capabilities of the UE, the request for capabilities indicating a set of frequency bands requested by the base station;
   determining a maximum uplink (UL) duty cycle of the UE for the connection to be a lowest UL duty cycle among a set of maximum UL duty cycles of a set of candidate frequency bands, each candidate frequency band included in (i) the set of frequency bands requested by the base station, and (ii) a plurality of frequency bands supported by the UE, each UE-supported frequency band associated with a respective maximum transmission power level (MTPL);
   providing, by the UE to the base station, an indication of the maximum UL duty cycle for the connection.

2. The method of claim 1, wherein the providing of the indication of the maximum UL duty cycle includes:
   including the indication in an Information Element (IE) of a message that reports capabilities of the UE or in another message.

3. The method of claim 1, wherein each UE-supported frequency band of the plurality of UE-supported frequency bands is also associated with a respective maximum UL duty cycle, and the indication of the maximum UL duty cycle for the connection is an indication of one of the respective maximum UL duty cycles associated with the plurality of UE-supported frequency bands.

4. The method of claim 3, further comprising:
   retrieving, from a memory of the UE, an indication of at least one maximum UL duty cycle associated with the plurality of UE-supported frequency bands.

5. The method of claim 3, wherein the determining of the maximum UL duty cycle includes:
   identifying, by the UE, the set of candidate frequency bands that are both supported by the UE and included in the set of frequency bands requested by the base station;
   retrieving, by the UE, a set of indications of maximum UL duty cycles corresponding to the set of candidate frequency bands; and
   selecting, based on the set of indications of maximum UL duty cycles, the lowest UL duty cycle as the maximum UL duty cycle for the connection.

6. The method of claim 5, wherein the identifying of the set of candidate frequency bands includes identifying each UE-supported frequency band included in the set of frequency bands requested by the base station.

7. The method of claim 1, wherein the base station is a first base station, the procedure to establish the connection between the UE and the first base station is a first procedure to establish a first connection, the request for capabilities of the UE is a first request for capabilities, and the method further comprises, during a second procedure to establish a second connection between the UE and the first base station or a second base station:
   receiving, by the UE from the first base station or the second base station, a second request for capabilities of the UE, the second request excluding an indication of any frequency band requested by the first base station or the second base station for the second connection;
   determining a frequency band having a lowest maximum UL duty cycle among the plurality of frequency bands supported by the UE; and
   selecting the UL duty cycle of the determined frequency band as the maximum UL duty cycle of the UE for the second connection.

8. The method of claim 7, wherein the determining of the frequency band having the lowest maximum UL duty cycle among the plurality of frequency bands supported by the UE includes accessing, by the UE, a global parameter stored in a memory of the UE.

9. The method of claim 1, wherein the maximum UL duty cycle of the UE for the connection is less than a UL duty cycle of the UE corresponding to the maximum transmission power level (MTPL) of the UE.

10. The method of claim 9, wherein the UL duty cycle of the UE corresponding to the MTPL of the UE corresponds to a lowest power class supported by the UE and a configuration of the UE that has a maximum available UL duty cycle.

11. The method of claim 1, further comprising:
    storing, in a memory of the UE, power data indicative of the respective maximum transmission power level (MTPL) for each UE-supported frequency band; and
    wherein the determining of the maximum UL duty cycle of the UE for the connection is further based on the power data.

12. The method of claim 11, wherein the storing of the power data indicative of the MTPLs for the plurality of UE-supported frequency bands includes storing an indication of a respective MTPL for each jurisdiction in a plurality of jurisdictions for which the UE is configured.

13. The method of claim 11, wherein the storing of the power data indicative of the MTPLs for the plurality of UE-supported frequency bands includes storing an indication of a respective MTPL for each power class supported by the UE.

14. The method of claim 1, wherein the determining of the maximum UL duty cycle for the connection is further based on a number of operational UL transceivers of the UE.

15. The method of claim 11, wherein:
the UE includes only a single operational UL transceiver, and
the determining of the maximum UL duty cycle of the UE for the connection based on the power data comprises selecting a lowest maximum UL duty cycle among a set of maximum UL duty cycles of a candidate set of UE-supported frequency bands to which the power data corresponds.

16. The method of claim 11, wherein:
the UE includes multiple operational UL transceivers; and
the determining of the maximum UL duty cycle of the UE for the connection further based on the power data includes:
 selecting a lowest maximum UL duty cycle among a set of maximum UL duty cycles of a candidate set of UE-supported frequency bands to which the power data corresponds; and
 decreasing the selected lowest maximum UL duty cycle based on at least one of: a total number of the multiple operational UL transceivers or respective bandwidths associated with the multiple operational UL transceivers to determine the maximum UL duty cycle of the UE for the connection.

17. The method of claim 1, further comprising:
determining, by the UE, an updated maximum UL duty cycle of the UE for the connection based on a change to a carrier configuration; and
providing, by the UE to the base station, an indication of the updated maximum UL duty cycle.

18. The method of claim 17, wherein:
the change to the carrier configuration includes one of an addition or a removal of one or more carrier components; and
the determining of the updated maximum UL duty cycle for the connection based on the change to the carrier configuration includes determining the updated maximum UL duty cycle for the connection based on at least one of: a total number of carrier components of the changed carrier configuration, or respective bandwidths of the carrier components of the changed carrier configuration.

19. The method of claim 17, wherein the request for the capabilities of the UE is a first request for UE capabilities, and the providing of the indication of the updated maximum UL duty cycle includes:
 transmitting, by the UE to the base station, an indication that the capabilities of the UE have been updated;
 receiving, by the UE from the base station, a second request for UE capabilities in response to the indication that the capabilities of the UE have been updated; and
 providing, by the UE to the base station, the indication of the updated maximum UL duty cycle in response to the second request for UE capabilities.

20. A User Equipment (UE), comprising:
one or more radio resource control (RRC) controllers;
one or more processors; and
one or more tangible memories storing computer-executable instructions that, when executed by the one or more processors, cause the UE to, during a procedure to establish a connection between the UE and the base station and while operating at any power class of a set of multiple power classes supported by the UE:
 determine a maximum uplink (UL) duty cycle of the UE for the connection to be a lowest UL duty cycle among a set of maximum UL duty cycles of a set of candidate frequency bands, each candidate frequency band included in (i) a set of frequency bands requested by the base station and indicated in a content of a request for capabilities of the UE received by the UE from the base station and (ii) a plurality of frequency bands supported by the UE, each UE-supported frequency band associated with a respective maximum transmission power level (MTPL); and
 cause an indication of the maximum UL duty cycle for the connection to be provided to the base station via the one or more RRC controllers.

\* \* \* \* \*